(12) United States Patent
Flordelis et al.

(10) Patent No.: US 12,316,413 B2
(45) Date of Patent: May 27, 2025

(54) METHODS FOR CAPABILITY SIGNALING, WIRELESS DEVICES AND NETWORK NODES

(71) Applicant: Sony Group Corporation, Tokyo (JP)

(72) Inventors: Jose Flordelis, Lund (SE); Kun Zhao, Malmo (SE); Kåre Agardh, Rydeback (SE); Olof Zander, Lund (SE); Erik Bengtsson, Lund (SE); Fredrik Rusek, Esloev (SE)

(73) Assignee: Sony Group Corporation, Tokyo (JP)

( * ) Notice: Subject to any disclaimer, the term of this patent is extended or adjusted under 35 U.S.C. 154(b) by 343 days.

(21) Appl. No.: 17/632,203

(22) PCT Filed: Jul. 3, 2020

(86) PCT No.: PCT/EP2020/068846
§ 371 (c)(1),
(2) Date: Feb. 1, 2022

(87) PCT Pub. No.: WO2021/028115
PCT Pub. Date: Feb. 18, 2021

(65) Prior Publication Data
US 2022/0286170 A1    Sep. 8, 2022

(30) Foreign Application Priority Data
Aug. 15, 2019  (SE) .................................. 1950935-5

(51) Int. Cl.
*H04B 7/06*  (2006.01)
*H04L 1/00*  (2006.01)
(Continued)

(52) U.S. Cl.
CPC .......... *H04B 7/0617* (2013.01); *H04B 7/063* (2013.01); *H04L 1/0025* (2013.01); *H04L 5/0096* (2013.01); *H04W 72/51* (2023.01)

(58) Field of Classification Search
None
See application file for complete search history.

(56) References Cited

U.S. PATENT DOCUMENTS

| | | | | |
|---|---|---|---|---|
| 8,036,710 B2 * | 10/2011 | Walton | ................ | H04W 52/029 455/574 |
| 11,722,177 B2 * | 8/2023 | Leabman | .............. | H02J 50/402 320/108 |

(Continued)

FOREIGN PATENT DOCUMENTS

| | | |
|---|---|---|
| CN | 108711682 A | 10/2018 |
| CN | 109076363 A | 12/2018 |

(Continued)

OTHER PUBLICATIONS

Huawei, Hisilicon, "Panel-based UL beam selection" [online], 3GPP TSG RAN WGI #96bis, R1-1903975, Apr. 8-12, 2019, 8 pgs.

(Continued)

*Primary Examiner* — Kenny S Lin
(74) *Attorney, Agent, or Firm* — Tucker Ellis LLP

(57) ABSTRACT

The present disclosure provides a method, performed by a wireless device, for capability signalling. The wireless device comprises one or more antenna panels configured to communicate with a network node. The method comprises obtaining a capability of at least one of the antenna panels, wherein the capability comprises at least one of: a receive-only panel, ROP, capability, a transmit-only panel, TOP, capability, a receive-and-transmit panel, RTP, capability and a dynamic RTP capability. The method comprises transmitting, to the network node, control signalling indicative of the obtained capability of the at least one antenna panel.

19 Claims, 7 Drawing Sheets

(51) Int. Cl.
  *H04L 5/00* (2006.01)
  *H04W 72/51* (2023.01)

(56) References Cited

U.S. PATENT DOCUMENTS

| | | | | |
|---|---|---|---|---|
| 2009/0206945 A1* | 8/2009 | Wagner | .................. | H03H 7/461 |
| | | | | 333/101 |
| 2018/0227094 A1* | 8/2018 | Liu | .................... | H04B 7/06966 |
| 2020/0267536 A1* | 8/2020 | Zhou | ................... | H04B 7/0404 |
| 2021/0281294 A1* | 9/2021 | Takano | ................ | H04W 16/28 |
| 2021/0281301 A1* | 9/2021 | Takano | ................ | H04B 7/0695 |
| 2021/0336737 A1 | 10/2021 | Li | | |
| 2022/0123817 A1* | 4/2022 | Karjalainen | .......... | G01S 5/0045 |
| 2022/0190883 A1* | 6/2022 | Kaya | ................... | H04B 7/0695 |

FOREIGN PATENT DOCUMENTS

| | | | | | |
|---|---|---|---|---|---|
| CN | 109155663 | A | | 1/2019 | |
| CN | 109417717 | A | | 3/2019 | |
| EP | 3806373 | A1 | * | 4/2021 | ........... H04B 7/0617 |
| EP | 3820050 | A1 | * | 5/2021 | .............. H04B 1/40 |
| WO | 2018183991 | A1 | | 10/2018 | |

OTHER PUBLICATIONS

Vivo, "Further discussion on multi beam operation", 3GPP TSG RAN WG1 #96bis R1-1904097, tsgr1_96b, Mar. 30, 2019, 7 pgs.

International Search Report and Written Opinion from corresponding International Application No. PCT/EP2020/068846, mailed on Sep. 30, 2020, 13 pages.

Office Action and Search Report from corresponding Swedish Application No. 1950935-5, mailed on Apr. 6, 2020, 8 pages.

Huawei, et al., "Panel-based UL beam selection," 3GPP TSG RAN WG1 Meeting #96bis, R1-1903975, Apr. 8-12, 2019 pages.

Qualcomm Incorporated, "Enhancements on Multi-beam Operation," 3GPP TSG-RAN WG1 Meeting #97, R1-1907290, May 13-17, 2019, 26 pages.

Nokia, et al., "On UE adaptation to the traffic," 3GPP TSG RAN WG1 #96, R1-1903134, Feb. 25-Mar. 1, 2019, 11 pages.

Huawei, et al., "Discussion on panel activation/deactivation status," 3GPP TSG RAN WG1 Meeting #97, R1-1907531, May 13-17, 2019, 2 pages.

Spreadtrum Communications, "Discussion on multi-beam operation", 3GPP TSG RAN WG1 #97, R1-1906370, May 13-17, 2019, 7 pages.

* cited by examiner

METHODS FOR CAPABILITY SIGNALING, WIRELESS DEVICES AND NETWORK NODES

The present disclosure pertains to the field of wireless communications. The present disclosure relates to methods for capability signalling, related network nodes and wireless devices.

BACKGROUND

A wireless device (for example a user equipment, UE) may have one or more antenna panels, e.g., one at its back, one in the front, and some at the sides. An antenna panel is a collection of antennas capable of transmitting with a single spatial filter (so called a beam), in either one or two polarizations, depending on the UE capability. Further, only a single antenna panel per UE can be used for transmission at all times, but multiple panels can be activated. An activated panel is an antenna panel that can be selected for transmission by the network node (for example gNB), and that should be able to transmit with a relatively short time delay (e.g. tens of µs). An antenna panel that is de-activated may have larger delay before becoming operational.

Wireless device implementations vary from vendor to vendor. In some implementations, due to hardware cost, antenna panels at the wireless device can only receive signals but are unable to transmit signals. In other cases, it could be the opposite.

Certain applications show extreme asymmetries in volume of downlink/uplink, DL/UL, traffic, and in those cases, an antenna panel may not need to be capable of both UL and DL traffic. An example where DL traffic is much higher than UL traffic is cloud-gaming services, where UL data is limited to the pad-inputs, but the DL data consists of everything that should be displayed to the screen. Converting this into numbers, a professional gamer may for example provide 2-3 instructions/s, so that a net UL data rate would be in the order of 20-30 bits/s (with 10 bit encoding per instruction), while DL data in 4K-resolution and 120 FPS would give a compressed net data rate of 20-30 Mbit/s.

An example where there is much more UL traffic than DL traffic is live broadcast of public events, such as football games. A professional camera should upload 4K-resolution and 120 FPS, amounting to several Gbit/s (video games may often be more efficiently compressed than video recordings). Meanwhile, the DL data consists of minor control data, such as "zoom in", "zoom out", etc.

SUMMARY

As illustrated, an antenna panel may not have the capability to transmit signals, but merely to receive signals (or vice versa), e.g. in various scenarios. The network node selection of antenna panel for activation does not take into account the capability of the respective antenna panel. Due to implementation, it can be foreseen that some wireless devices may be equipped with antenna panels for increased receive (or transmit) quality. For example, for such antenna panels, a need still exists for selecting the optimal beam, which means that the standard beam sweep procedure needs to be maintained.

Accordingly, there is a need for wireless devices, network nodes, and methods for capability signaling, which address, mitigate, or alleviate the shortcomings existing and enable an improved selection of one or more antenna panels to be used by the wireless device in communication with a network node based on the capability of the antenna panel.

The present disclosure provides a method, performed at a wireless device, for capability signalling. The wireless device comprises one or more antenna panels configured to communicate with a network node. The method comprises obtaining a capability of at least one of the antenna panels. The capability comprises at least one of: a receive-only panel, ROP, capability, a transmit-only panel, TOP, capability, a receive-and-transmit panel, RTP, capability and a dynamic RTP capability. The method comprises transmitting, to the network node, control signalling indicative of the obtained capability of the at least one antenna panel.

Further, a wireless device is provided, the wireless device comprising: a memory circuitry, a processor circuitry, and a wireless interface. The wireless device is configured to perform any of the methods disclosed herein.

The present disclosure enables the wireless device to adapt the selection of the antenna panels to the various radio conditions, as the wireless device is capable of exploiting antenna panels which are capable of transmission only and/or reception only to improve transmission and/or reception respectively. This may lead to an improved radio performance (e.g. in terms of interference, and/or Maximum Permissible Exposure) at the wireless device and possibly power savings. This also allows the wireless device to have simplified architecture and design, which reduces costs.

The present disclosure provides a method performed at a network node. The method comprises receiving, from the wireless device, control signalling indicative of a capability, the capability comprising at least one of: a receive-only panel, ROP, capability, a transmit-only panel, TOP, capability, a receive-and-transmit panel, RTP, capability and a dynamic RTP capability. The method comprises scheduling transmission of the wireless device based on the capability indicated by the received control signalling.

Further, a network node is provided, the network node comprising: a memory circuitry, a processor circuitry, and a wireless interface, wherein the network node is configured to perform any of the methods.

The disclosed network node can allow the wireless device to enhance the radio performance of the wireless device (e.g. in terms of interference, and/or Maximum Permissible Exposure) by exploiting knowledge about antenna panels which have e.g. receive only and/or transmit only capabilities. This also allows the network node to improve the scheduling of communications by the wireless device which benefits from a simplified architecture and design, and reduced costs.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1A:
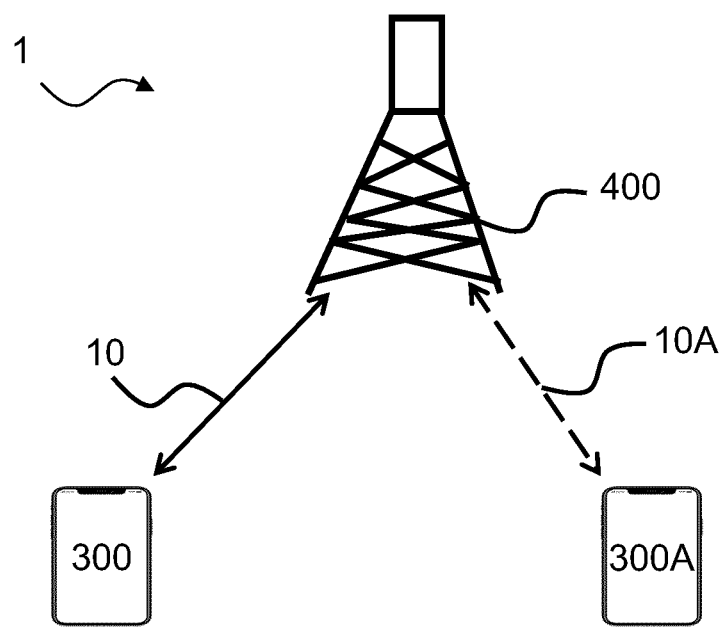
FIG. 1A is a diagram illustrating an exemplary wireless communication system comprising an exemplary network node and an exemplary wireless device according to this disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the disclosure or as a limitation on the scope of the disclosure. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1A is a diagram illustrating an exemplary wireless communication system 1 comprising an exemplary network node 400 and an exemplary wireless device 300 according to this disclosure.

As discussed in detail herein, the present disclosure relates to a wireless communication system 1 comprising a cellular system, e.g. a $3^{rd}$ Generation Partnership Project (3GPP) wireless communication system, e.g. millimetre wave communication. The wireless communication system 1 comprises a wireless device 300 and/or a network node 400.

A network node disclosed herein refers to radio network node, and/or a radio access network node operating in the radio access network, such as a base station, an evolved Node B, eNB, gNB.

The wireless communication system 1 described herein may comprise one or more wireless devices 300, 300A, and/or one or more network nodes 400, such as one or more of: a base station, an eNB, a gNB and/or an access point.

A wireless device may refer to as a mobile device and/or a user equipment, UE.

The wireless device 300, 300A may be configured to communicate with the network node 400 via a wireless link (or radio access link) 10, 10A.

In 3GPP, a set of antennas to/from which a beam is directed/radiated can be declared as an antenna panel. An antenna panel may comprise a collection of antenna elements. An antenna panel can be in two activation modes, either active or deactivated. The network node, e.g. gNB, can change the activation mode of every panel. A maximum transition time delay between deactivated and active mode may be specified. Multiple panels can be active at the same time. Only a single antenna panel may be used for transmission at every time instant in one or more example embodiments. An antenna panel identifier may be introduced and can be coupled to the Sounding Reference Signal (SRS)-resource set used for that antenna panel. The network node, gNB, can change which antenna panel should be used for transmission among the active panels. A maximum delay associated with such change may be specified.

For wireless devices comprising antenna panels only capable of either receiving or transmitting, but not both, the network node may require an antenna panel to transmit even if the antenna panel has a receive only capability, which is not optimal. In other words, an antenna panel that can only receive, may at any time be requested by the network node to start transmitting. Further, when antenna panels are declared via their SRS-resource set, receive-only antenna panels cannot be declared to the network node, gNB, since SRSs are UL reference symbols. It is to be noted that in such example, the antenna panel cannot send anything, so it cannot declare itself to the network node.

An antenna panel with receive only feature or with transmit only features can save cost. In addition to hardware limitations, an antenna panel can behave as transmitter-only or receiver-only due to network configuration or due to a UE request. For example: when the user body is getting close to one antenna panel, as detected by for example a proximity sensor, the wireless device may determine to lower or turn off a transmit power of an antenna panel to meet the Maximum Permissible Exposure (MPE) requirement from regulators (e.g. Specific Absorption Rate, SAR, and/or power density).

Figure 1B:
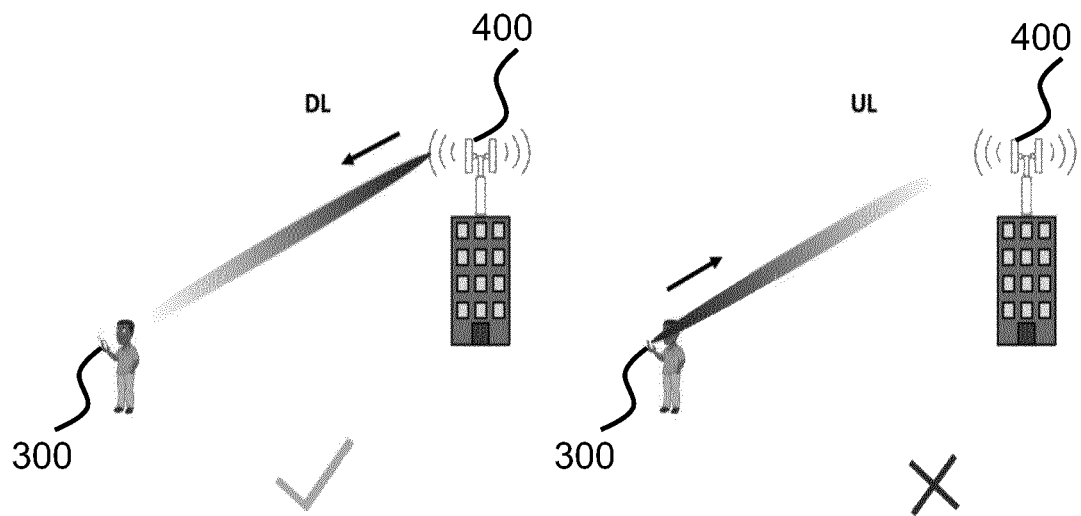
FIG. 1B is a diagram illustrating an example antenna panel with a receive-only panel capability according to this disclosure.

Conventionally, one can simply switch to another antenna panel. However, this may be detrimental. For example, the new antenna panel may suffer larger path loss than the original antenna panel since it points to a different direction. Also, there may be a lot of overhead since there commonly is a delay to connect a new antenna panel into a network node. As an alternative, only the UL may be switched to another antenna panel, but the same DL antenna panel may be kept (because there is no MPE issue in DL), which is illustrated in FIG. 1B. Therefore, one antenna panel can be configured as a receive only panel and the other antenna panel can be configured as transmit only panel within a certain period of time. For example, the other antenna panel may need to switch to TOP within a certain period of time, and/or the other antenna panel may be configured to be in a TOP mode for a certain period of time. An example is illustrated in FIG. 1B. FIG. 1B is a diagram illustrating an example antenna panel according to this disclosure. The wireless device 300 is configured to communicate with network node 400. The wireless device 300 uses an antenna panel configured as a receive only panel which cannot transmit.

Figure 1C:
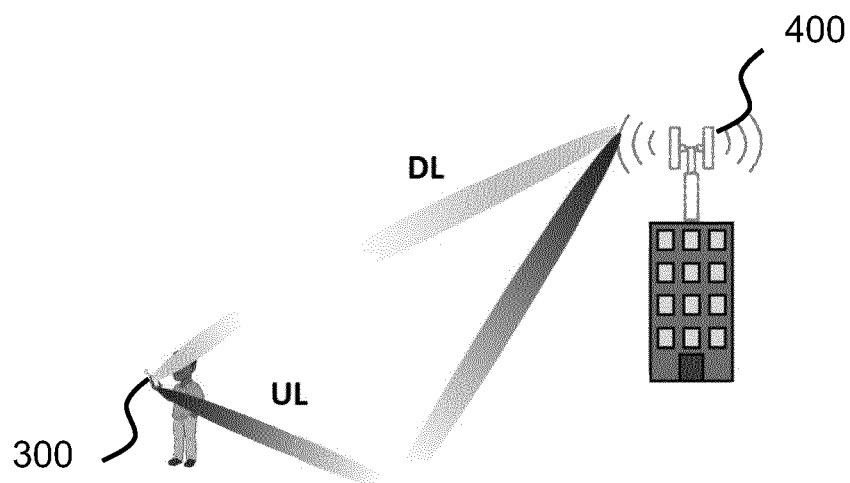
FIG. 1C is a diagram illustrating example antenna panels according to this disclosure.

It may also be envisaged that the wireless device may have DL and UL beam pairs which are different as illustrated in FIG. 1C. FIG. 1C is a diagram illustrating an example antenna panel according to this disclosure. The wireless device 300 is configured to communicate with network node 400. There is a need for the network node realize this situation and to be configured with proper signaling.

Other scenarios, for example to reduce the interference in certain directions, can also benefit from setting an antenna panel to transmit or receive only.

In other words, it may be an assumption from the network node that an antenna panel selected for transmission should be used both for reception and transmission. However, a transmit-only antenna panel cannot perform reception.

The present disclosure provides methods that can be seamlessly incorporated into 3GPP's NR specification that allows for receive- and transmit-only antenna panels to be considered by the network node.

The present disclosure proposes to improve a selection of antenna panels of the wireless device by the network node based on the received capability of antenna panel and communicating the selection to the wireless device which is then capable of activating the appropriate antenna panels to be used for communication. The capability may be seen as a communication feature of an antenna panel, such as the ability to receive only (e.g. a receive-only panel, ROP), to transmit only (e.g. a transmit-only panel, TOP), or to receive-and-transmit (e.g. a receive-and-transmit panel, RTP), or to dynamically switch between ROP, TOP and RTP.

Figure 2:
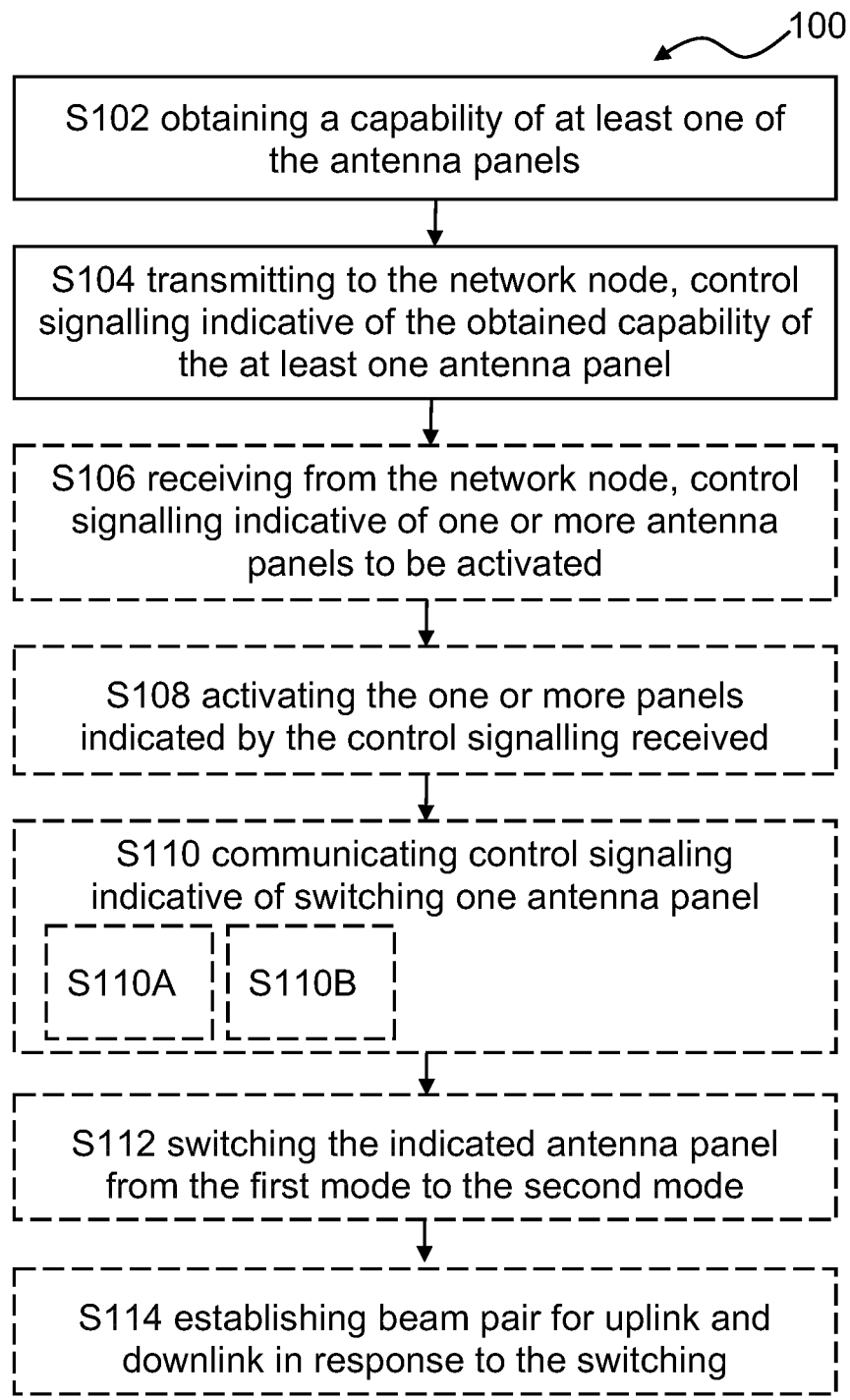
FIG. 2 is a flow-chart illustrating an exemplary method, performed by a wireless device node, for capability signalling according to this disclosure.

FIG. 2 shows a flow diagram of an exemplary method 100 for capability signalling according to the disclosure. The method 100 is performed at a wireless device (e.g. the wireless device disclosed herein, e.g. wireless device 300 of FIGS. 1A-C and 4). The wireless device comprises one or more antenna panels configured to communicate with a network node (e.g. the network node disclosed herein, such as network node 400 of FIGS. 1A-C, and 5). For example, the wireless device comprises a plurality of antenna panels.

The method 100 comprises obtaining S102 a capability of at least one of the antenna panels. For example, obtaining S102 a capability of at least one of the antenna panels comprises obtaining, from a memory circuitry of the wireless device, the capability of the at least one of the antenna panels. For example, the wireless device can retrieve the capability of at least one of the one or more antenna panels from the memory circuitry or of each of the one or more antenna panels. The capability comprises at least one of: a receive-only panel, ROP, capability, a transmit-only panel, TOP, capability, a receive-and-transmit panel, RTP, capability and a dynamic RTP capability. The capability may be seen as a communication feature of an antenna panel, such as the ability to only receive, to only transmit, or to receive-and-transmit, or to dynamically switch between ROP, TOP and RTP. In other words, the capability indicates whether an antenna panel is capable of receive-only, transmit-only, receive-and-transmit, and/or to dynamically switch between any of the ROP, TOP, RTP modes. The dynamic RTP capability indicates that the antenna panel has a dynamic capability that may switch between Rx only, Tx only and Rx-and-tx mode. For example, a ROP or a TOP is an antenna panel capable of unidirectional communication. Obtaining the capability of an antenna panel may comprise obtaining an indicator indicative of the capability of the antenna panel.

The method 100 comprises transmitting S104, to the network node, control signalling indicative of the obtained capability of the at least one antenna panel. For example, transmitting S104 comprises declaring to the network node the obtained capability via control signalling in terms of one or more of ROP, TOP, RTP, and dynamic RTP. For example, the control signalling may comprise one or more control signals/messages indicative of the obtained capability. For example, the one or more control signals/messages indicative of the obtained capability comprises one or more indicators representative of the capability of antenna panel in terms of any one or more of ROP, TOP, RTP, and dynamic RTP. For example, capability reporting may indicate the obtained capability. For example, during capability reporting, the wireless device can report a presence of a number of ROPs (e.g. which can be active or deactivated, but cannot be requested to transmit). For example, the wireless device may transmit a beam candidate reporting for each ROP or at least one ROP, which provides the network node with information about the receive quality of corresponding ROP. The wireless device may activate a ROP to increase the number of spatial streams in the DL, or to increase the DL signal to noise ratio, SNR.

For example, during capability reporting, the wireless device can report presence of a number of TOPs (e.g. which can be active or deactivated, but cannot be requested to receive). For example, in some situations for TOPs, the notion of beam correspondence may no longer apply, and an UL beam sweep is necessary from each TOP. In some situations, beam correspondence may apply, e.g., when a TOP is quasi-co-located with a ROP, at least to some degree. For example, in case a TOP is selected for transmission, the wireless device may need to use another antenna panel for reception. The wireless device may activate another antenna panel to add additional spatial streams, to transmit the only UL streams (assuming that the antenna panel used for reception is not transmitting any UL data), and/or to improve the performance of the streams transmitted from the antenna panel that is used for reception. The wireless device may activate another antenna panel in response to receiving control signaling S106 or based on its own decision. It may be envisaged that the wireless device may operate in a certain frequency band that restricts operations to transmit only or receive only (e.g. supplementary downlink band SDL, supplementary up-link band SUL). The wireless device may declare a multiband antenna panel as ROP for one frequency band and as TOP for another frequency band.

In one or more example methods, the method 100 comprises receiving S106, from the network node, control signalling indicative of one or more antenna panels to be activated. For example, the wireless device may receive from the network node control signalling indicative of one or more antenna panels to be activated by the wireless device. In one or more example methods, the method 100 comprises activating S108 the one or more panels indicated by the control signalling received. For example, the wireless device may activate the one or more antenna panels according to the control signalling indicative of one or more antenna panels to be activated. The control signalling indicative of one or more antenna panels to be activated may comprise one or more control signals/messages indicative of the one or more antenna panels to be activated. For example, the control signals/messages may comprise one or more antenna panel identifier corresponding to the one or more antenna panels to be activated.

In one or more example methods, the method 100 comprises communicating S110, between the wireless device and the network node, control signalling indicative of switching of one of the antenna panels having a dynamic RTP capability from a first mode to a second mode. In one or more example methods, the first mode comprises one of: a ROP mode, a TOP mode, a RTP mode and a deactivate mode, wherein the second mode comprises one of: a ROP mode, a TOP mode, RTP mode and a deactivate mode. For example, the first mode and the second mode are different modes. For example, the control signalling may indicate to switch from ROP mode to RTP mode or vice-versa. RTP mode may be seen as dual mode while ROP and TOP may be seen as single mode. For example, control signalling indicative of switching of one of the antenna panels having the dynamic RTP capability from a first mode to a second mode can comprise one or more control signals/messages indicative of switching of one of the antenna panels having a dynamic RTP capability from a first mode to a second mode. For example, one or more control signals/messages indicative of switching of one of the antenna panels having a dynamic RTP capability from a first mode to a second mode can comprise one or more switching indicators associated with respective panel identifiers for the antenna panels indicated for switching from the first mode to the second mode. In one or more example methods, communicating S110, between the wireless device and the network node, control signalling indicative of switching of one of the antenna panels comprises receiving S110A from the network node, control signalling instructing the wireless device to switch the one antenna panel from the first mode to the second mode. In other words, the wireless device may be indicated to switch mode by the network node, e.g. due to radio conditions, for a given antenna panel. For example, the network node may transmit to the wireless device control signalling indicating that the current panel is to be switched from an RTP mode to a ROP/TOP mode because the network node had received control signalling indicative of the current panel having a dynamic RTP capability transmitted in S104. For example, the wireless device may need to establish an alternative beam pair for UL/DL. For example, the control signalling received in S110A may be used by the wireless device to reset an antenna panel from a TOP or ROP mode to a RTP mode (e.g. UL&DL capable) when the antenna panel has a dynamic RTP capability. For example, the wireless device may receive the control signalling of S110A in SAR scenario to reduce transmit power, and this may be triggered by the network node, gNB.

In one or more example methods, communicating S110, between the wireless device and the network node, control signalling indicative of switching of one of the antenna panels comprises transmitting S110B, to the network node, control signalling indicating to the network node that the wireless device intends to switch the one antenna panel from the first mode to the second mode. A signalling transmitted from UE to gNB that the current panel will be switched to a ROP/TOP mode, additional beam pair for UL/DL needs to be established. A signalling from UE to gNB to reset the TOP/ROP panel back to a UL&DL capable panel.

In one or more example methods, the method 100 may comprise transmitting to the network node control signalling indicative of an activation of an antenna panel (e.g., UE-initiated panel activation).

In one or more example methods, the method 100 comprises switching S112 the indicated antenna panel from the first mode to the second mode.

In one or more example methods, the method 100 comprises establishing S114 a beam pair for uplink and downlink in response to the switching S112 and/or in response to the activating S108. For example, after switching S112 an antenna panel from a first mode to a second mode, there may be a need for establishing a new beam pair for uplink and downlink. For example, after activating S108 an antenna panel, there may be a need for establishing a new beam pair for uplink and downlink.

In one or more example methods, the control signalling indicates a time period. The time period may indicate for how long an activation and/or an indicated second mode is valid. In one or more example methods, the method 100 comprises performing an additional switching of the one antenna panel in response to expiry of the time period. For example, an antenna panel set to be in TOP/ROP mode can be reset after certain time period indicated in the control signalling. The time period can be included in the control signalling communicated in S110. The additional switching may be from any of TOP mode, ROP mode, RTP mode, and deactivate mode to any of TOP mode, ROP mode, RTP mode and deactivate mode.

Figure 3:
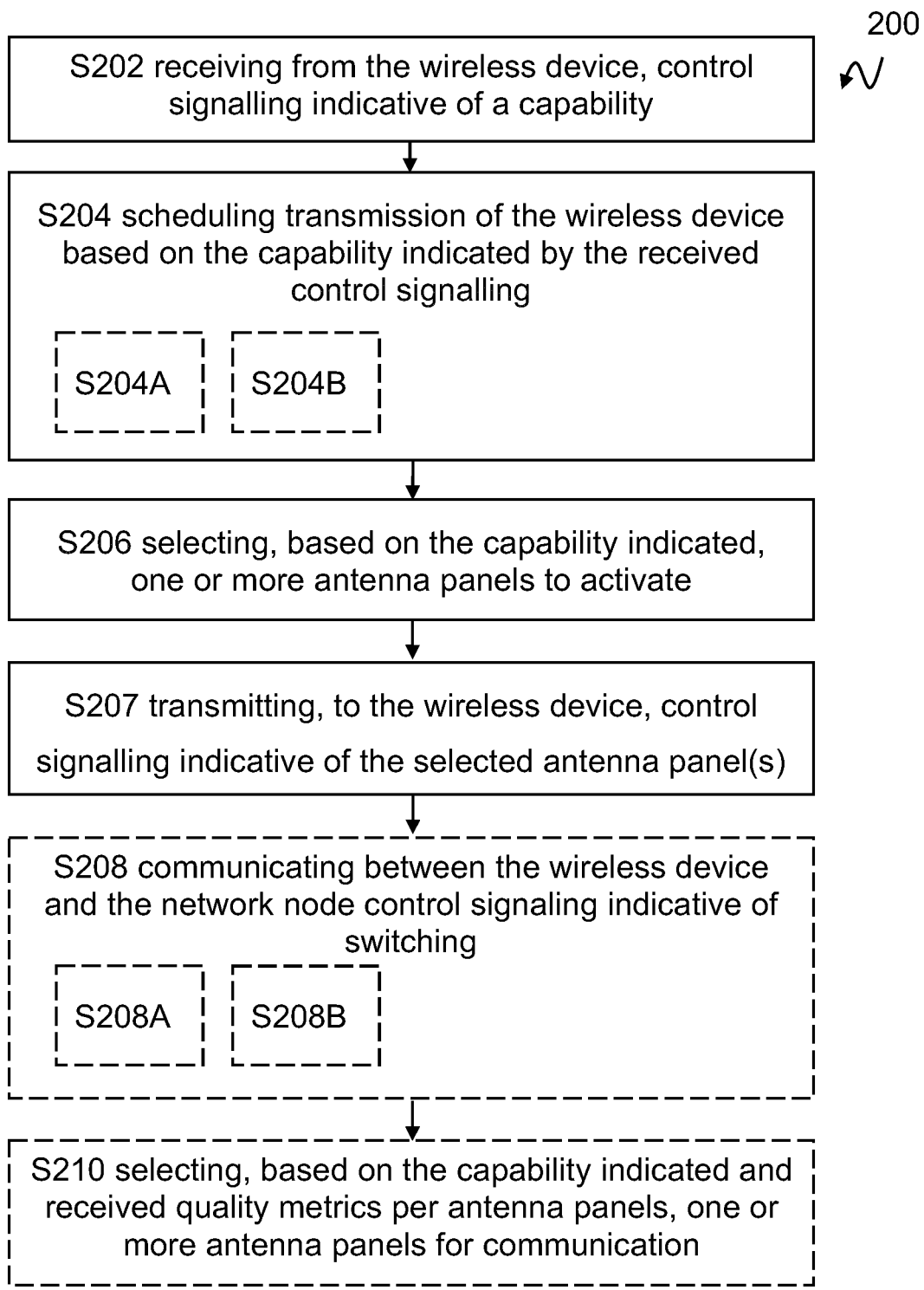
FIG. 3 is a flow-chart illustrating an exemplary method, performed by a network node of a wireless communication system according to this disclosure.

FIG. 3 shows a flow diagram of an exemplary method 200 according to the disclosure. The method 200 is performed at a network node (such as a network node disclosed herein, e.g. network node 400 of FIGS. 1A-C and 5-6). The network node is configured to communicate with a wireless device via one or more antenna panels of the wireless device (e.g. the wireless device disclosed herein).

The method 200 comprises receiving S202, from the wireless device, control signalling indicative of a capability. The capability comprises at least one of: a receive-only panel, ROP, capability, a transmit-only panel, TOP, capability, a receive-and-transmit panel, RTP, capability and a dynamic RTP capability. For example, a ROP capability and a TOP capability are for unidirectional communication. In other words, the capability indicates whether an antenna panel is capable of receive-only, transmit-only, receive-and-transmit, and/or to dynamically switch between any of the ROP, TOP, RTP modes. In one or more example methods, the control signalling comprises one or more control signals/messages which may comprises one or more indicators representative of the capability of antenna panel in terms of any one or more of ROP, TOP, RTP, and dynamic RTP. For example, the control signalling indicative of the capability may be received via capability reporting. For example, the control signalling indicative of the capability is transmitted by the wireless device in S104 of FIG. 2.

The method 200 comprises scheduling S204 transmission of the wireless device (or communication of the wireless device, e.g. transmission and/or reception of the wireless device) based on the capability indicated by the received control signalling (of S104 of FIG. 2 or S202 of FIG. 3).

In one or more example methods, the method 200 comprises selecting S206, based on the capability indicated, one or more antenna panels to activate. In one or more example methods, the method 200 comprises selecting S210, based on the capability indicated and received quality metrics per antenna panels, one or more antenna panels for communication. For example, the network node selects the one or more antenna panels based on the capability in terms of ROP, ROP, RTP and/or dynamic RTP and based on a reference signal for the received quality metrics per panel (e.g. RSRP value per panel, SNR/SINR, RSRQ per panel reported by the wireless device). For example, the network node selects the one or more antenna panels based on the capability in terms of ROP, ROP, RTP and/or dynamic RTP and based on an indication from the wireless device that the wireless device transmissions from an antenna panel may be close to a pre-specified Maximum Permissible Exposure (MPE) limits.

In one or more example methods, the method 200 comprises transmitting S207, to the wireless device, control signalling indicative of the selected one or more antenna panels. For example, the control signalling indicative of control signalling indicative of switching of one of the antenna panels is received by the wireless device in S106 of FIG. 2. The control signalling indicative of the selected one or more antenna panels may comprise one or more control signals/messages indicative of the one or more antenna panels selected which the wireless device may activate. For example, the control signals/messages may comprise one or more antenna panel identifier corresponding to the one or more antenna panels selected.

In one or more example methods, the method 200 comprises communicating S208, between the wireless device and the network node, control signalling indicative of switching of one of the antenna panels having a dynamic RTP capability from a first mode to a second mode. In one or more example methods, the first mode comprises one of: a ROP mode, a TOP mode, RTP mode and a deactivate mode. In one or more example methods, the second mode comprises one of: a ROP mode, a TOP mode, RTP mode and a deactivate mode. For example, the control signalling indicative of control signalling indicative of switching of one of the antenna panels is communicated between the wireless device and the network node in S110 of FIG. 2. For example, the control signalling may indicate to switch from ROP mode to RTP mode or vice-versa. RTP mode may be seen as dual mode while ROP and TOP may be seen as single mode. For example, control signalling indicative of switching of one of the antenna panels having the dynamic RTP capability from a first mode to a second mode can comprises one or more control signals/messages indicative of switching of one of the antenna panels having a dynamic RTP capability from a first mode to a second mode. For example, one or more control signals/messages indicative of switching of one of the antenna panels having a dynamic RTP capability from a first mode to a second mode can comprise one or more switching indicators associated with respective panel identifiers for the antenna panels indicated for switching from the first mode to the second mode.

In one or more example methods, communicating S208, between the wireless device and the network node, the control signalling indicative of switching of one of the antenna panels comprises transmitting S208A, to the wireless device, control signalling instructing the wireless device to switch the indicated antenna panel having a dynamic RTP capability from the first mode to the second mode. For example, the control signalling indicative of control signalling indicative of switching of one of the antenna panels is received by the wireless device in S110A of FIG. 2.

In one or more example methods, communicating S208, between the wireless device and the network node, control signalling indicative of switching of one of the antenna panels comprises receiving S208B, from the wireless device, control signalling indicating to the network node that the wireless device intends to switch the one antenna panel from the first mode to the second mode. For example, the control signalling indicative of control signalling indicative of switching of one of the antenna panels is transmitted by the wireless device in S110B of FIG. 2.

In one or more example methods, scheduling S204 transmission of the wireless device based on the capability indicated by the received control signalling comprises scheduling S204A an uplink transmission for an antenna panel having at least one of: the TOP capability, the RTP capability and the dynamic RTP capability.

In one or more example methods, scheduling S204 transmission of the wireless device based on the capability indicated by the received control signalling comprises scheduling S204B a downlink transmission for an antenna panel having at least one of: the ROP capability, the RTP capability and the dynamic RTP capability.

Figure 4:
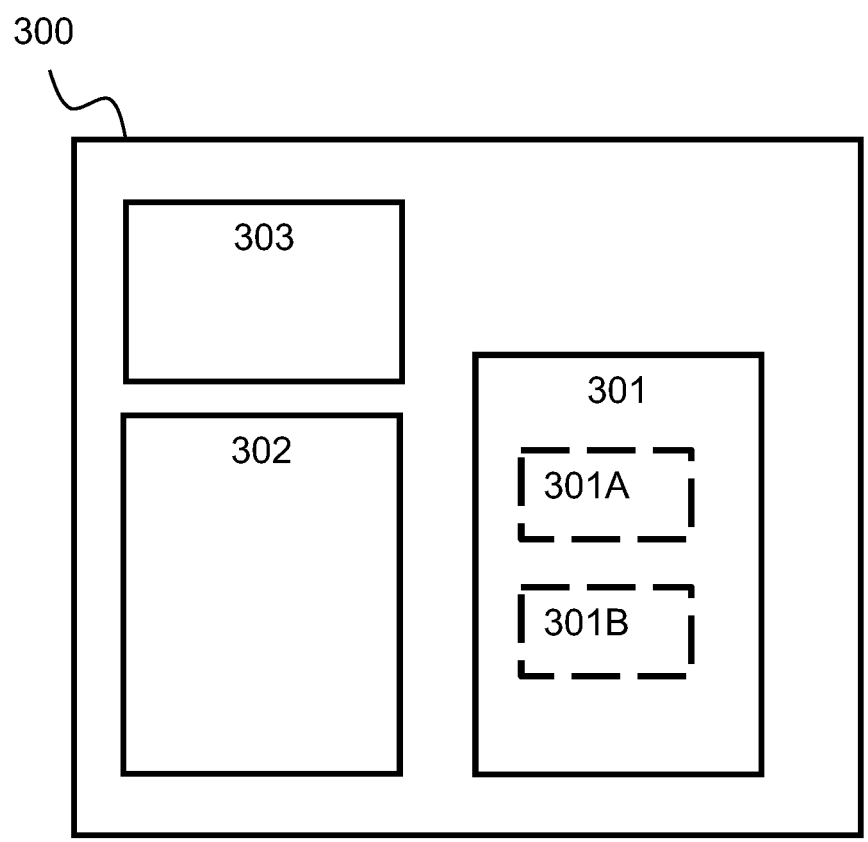
FIG. 4 is a block diagram illustrating an exemplary wireless device according to this disclosure.

FIG. 4 shows a block diagram of an exemplary wireless device 300 according to the disclosure. The wireless device 300 comprises a memory circuitry 303, a processor circuitry 302, and a wireless interface 301. The wireless device 300 may be configured to perform any of the methods disclosed in FIG. 2.

A wireless device 300 may have one or more antenna panels. Typically, the wireless device 300 comprises a plurality of antenna panels. An antenna panel activated (even in idle) consumes power, and it is therefore needed to reduce the power consumption while still maintaining the radio performance of the wireless device. An antenna panel may comprise e.g. a single array of antennas or multiple arrays of antennas. It is to be noted that the antenna panel disclosed herein may for example refer to a hardware antenna module or a logic structure (e.g. logic element, and/or software module) associated with a hardware antenna module. In other words, an antenna panel may be seen as a logical device that transmits one corresponding beam in one or more embodiments. In contrast, in one or more embodiments, the antenna panel may be seen a physical device that may transmit several beams.

At the wireless device, a downlink (DL) beam corresponds to a receive (Rx) beam while an UL beam corresponds to a transmit (Tx) beam.

At the network node, when the network node is configured to communicate with the wireless device using a set of beams, a DL beam corresponds to a transmit (Tx) beam while an UL beam corresponds to a receive (Rx) beam.

The wireless device 300 is configured to communicate with a network node, such as the network node disclosed herein, using a wireless communication system. The wireless interface 301 is configured for wireless communications via a wireless communication system, such as a 3GPP system, such as a 3GPP system supporting millimetre-wave communications.

The wireless interface 301 comprises one or more antenna panels including a first antenna panel 301A and optionally a second antenna panel 301B, wherein the first antenna panel 301A and/optionally the second antenna panel 301B are configured to communicate, with a network node. The first antenna panel 301A may have a capability which may be any type: a receive-only panel, ROP, capability, a transmit-only panel, TOP, capability, a receive-and-transmit panel, RTP, capability and a dynamic RTP capability. The second antenna panel 301B may have a capability which may be any type: a receive-only panel, ROP, capability, a transmit-only panel, TOP, capability, a receive-and-transmit panel, RTP, capability and a dynamic RTP capability.

The wireless device 300 is configured to obtain, e.g. via the processor circuitry 302 from the memory circuitry 303, a capability of at least one of the antenna panels. The capability comprises at least one of: a receive-only panel, ROP, capability, a transmit-only panel, TOP, capability, a receive-and-transmit panel, RTP, capability and a dynamic RTP capability.

The wireless device 300 is configured to transmit, via the wireless interface 301, to the network node, control signalling indicative of the obtained capability of the at least one antenna panel.

The processor circuitry 302 is optionally configured to perform any of the operations disclosed in FIG. 2 (e.g. S106, S108, S110, S110A, S110B, S112, S114). The operations of the wireless device 300 may be embodied in the form of executable logic routines (e.g., lines of code, software programs, etc.) that are stored on a non-transitory computer readable medium (e.g., the memory circuitry 303) and are executed by the processor circuitry 302.

Furthermore, the operations of the wireless device 300 may be considered a method that the wireless circuitry is configured to carry out. Also, while the described functions and operations may be implemented in software, such functionality may as well be carried out via dedicated hardware or firmware, or some combination of hardware, firmware and/or software.

The memory circuitry 303 may be one or more of a buffer, a flash memory, a hard drive, a removable media, a volatile memory, a non-volatile memory, a random access memory (RAM), or other suitable device. In a typical arrangement, the memory circuitry 303 may include a non-volatile memory for long term data storage and a volatile memory that functions as system memory for the processor circuitry 303. The memory circuitry 303 may exchange data with the processor circuitry 302 over a data bus. Control lines and an address bus between the memory circuitry 303 and the processor circuitry 302 also may be present (not shown in FIG. 4). The memory circuitry 303 is considered a non-transitory computer readable medium.

The memory circuitry 303 may be configured to store the capability of the antenna panels optionally associated with corresponding panel identifier(s).

Figure 5:
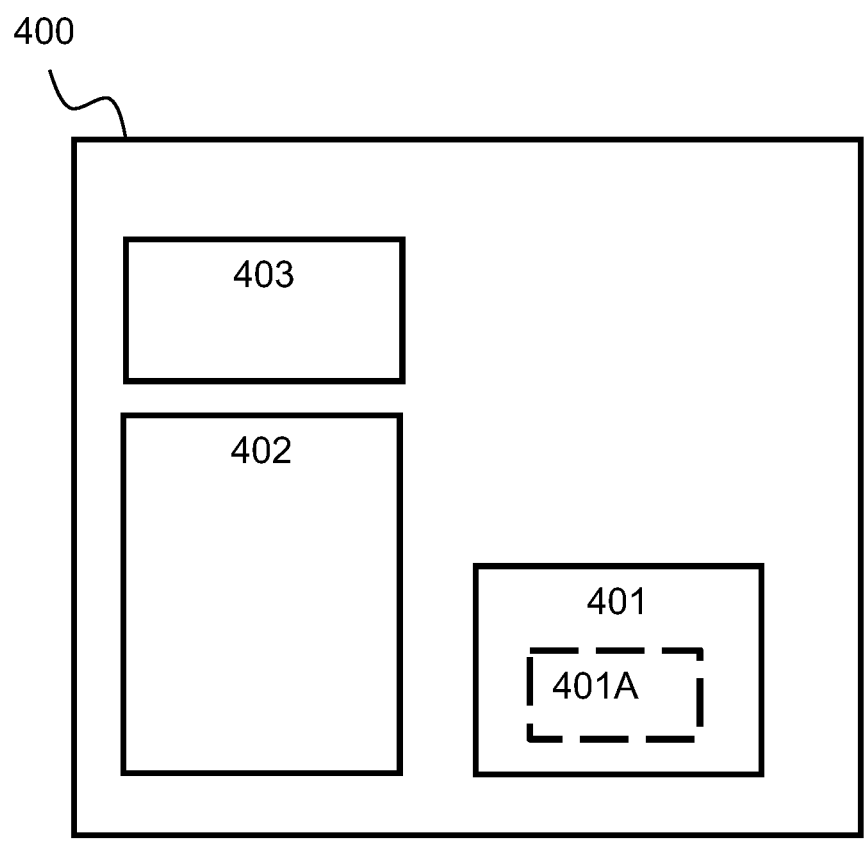
FIG. 5 is a block diagram illustrating an exemplary network node according to this disclosure.

FIG. 5 shows a block diagram of an exemplary network node 400 according to the disclosure. The network node 400 comprises a wireless interface 401, a processor circuitry 402, and a memory circuitry 403. The network node 400 may be configured to perform any of the methods disclosed in FIG. 3.

The network node 400 is configured to communicate with a wireless device, such as the wireless device disclosed herein, using a wireless communication system. The wireless interface 401 is configured for wireless communications via a wireless communication system, such as a 3GPP system, such as supporting millimetre wave communications.

The wireless interface 401 may comprise one or more antenna panels including antenna panel 401A. The network node 400 is optionally configured to communicate (via the wireless interface 401), using a set of beams (e.g. radiated by 401A), with a wireless device. The network node 400 is optionally configured to communicate (via the wireless interface 401), using an omnidirectional antenna with a wireless device.

The network node 400 is configured to receive, via the wireless interface 401 and/or the processor circuitry 402, from the wireless device, control signalling indicative of a capability, the capability comprising at least one of: a receive-only panel, ROP, capability, a transmit-only panel, TOP, capability, a receive-and-transmit panel, RTP, capability and a dynamic RTP capability.

The network node 400 is configured to schedule, via the processor circuitry 402, transmission of the wireless device based on the capability indicated by the received control signalling.

The processor circuitry 402 is optionally configured to perform any of the operations disclosed in FIG. 3 (e.g. S204A, S204B, S206, S207, S208, S208A, S208B, S210). The operations of the network node 400 may be embodied in the form of executable logic routines (e.g., lines of code, software programs, etc.) that are stored on a non-transitory computer readable medium (e.g., the memory circuitry 403) and are executed by the processor circuitry 402.

Furthermore, the operations of the network node 400 may be considered a method that the network node is configured to carry out. Also, while the described functions and operations may be implemented in software, such functionality may as well be carried out via dedicated hardware or firmware, or some combination of hardware, firmware and/or software.

The memory circuitry 403 may be one or more of a buffer, a flash memory, a hard drive, a removable media, a volatile memory, a non-volatile memory, a random access memory (RAM), or other suitable device. In a typical arrangement, the memory circuitry 403 may include a non-volatile memory for long term data storage and a volatile memory that functions as system memory for the processor circuitry 403. The memory circuitry 403 may exchange data with the processor circuitry 402 over a data bus. Control lines and an address bus between the memory circuitry 403 and the processor circuitry 402 also may be present (not shown in FIG. 5). The memory circuitry 403 is considered a non-transitory computer readable medium.

Figure 6:
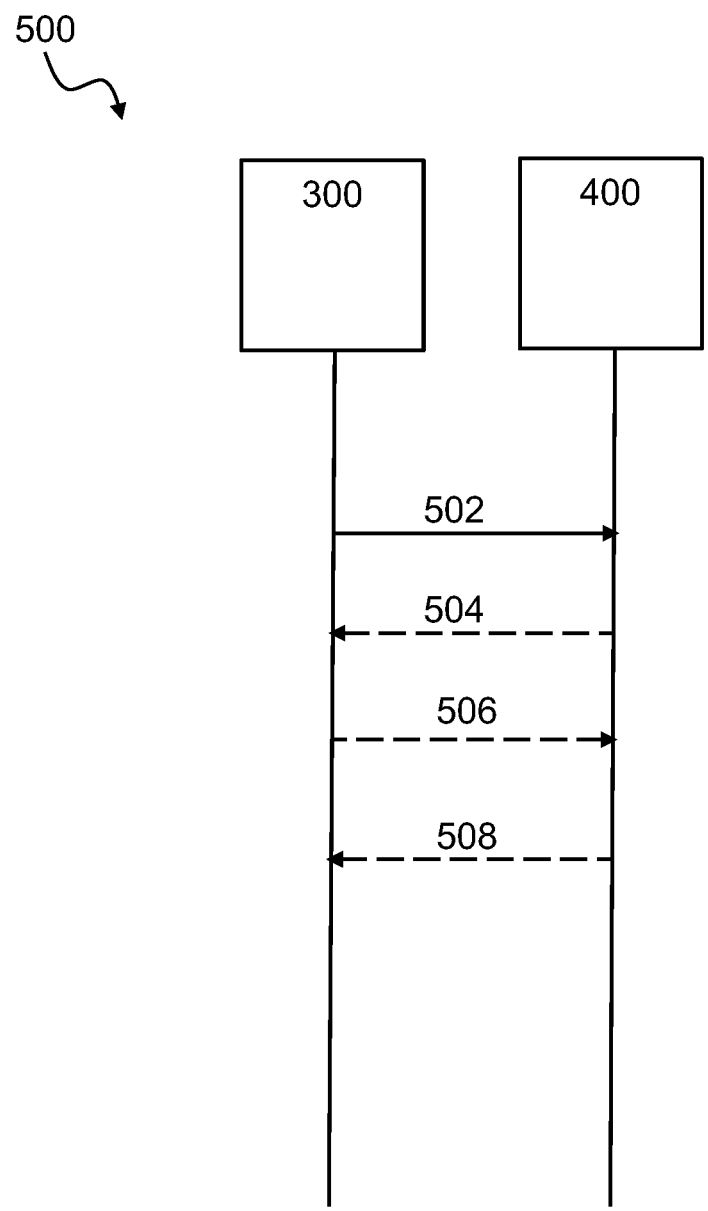
FIG. 6 is a signalling diagram illustrating an exemplary signalling between an exemplary network node and an exemplary wireless device according to this disclosure.

FIG. 6 is a signalling diagram 500 illustrating an exemplary signalling between an exemplary network node 400 and an exemplary wireless device 300 according to this disclosure.

The wireless device 300 transmits to the network node 400 control signalling 502 indicative of a capability of the at least one antenna panel in terms of at least one of: a receive-only panel, ROP, capability, a transmit-only panel, TOP, capability, a receive-and-transmit panel, RTP, capability and a dynamic RTP capability.

The network node 400 may determine which antenna panel is to be activated as a ROP, TOP, or RTP based on 502 and may respond by transmitting control signalling 504 indicative of one or more antenna panels to be activated.

Upon receipt, the wireless device 300 may activate the one or more panels indicated by the control signalling 504 received.

Optionally, the wireless device 300 may communicate, between the wireless device 300 and the network node 500, control signalling indicative of switching of one of the antenna panels having a dynamic RTP capability from a first mode to a second mode, wherein the first mode comprises one of: a ROP mode, a TOP mode, and a RTP mode and a deactivate mode, wherein the second mode comprises one of: a ROP mode, a TOP mode, a RTP mode and a deactivate mode. For this, the wireless device 300 may receive control signalling 508 instructing the wireless device 300 to switch the one antenna panel from the first mode to the second mode and/or or transmit control signalling 506 indicating to the network node 500 that the wireless device 300 intends to switch the one antenna panel from the first mode to the second mode.

Upon such communication, the wireless device 300 may switch the indicated antenna panel in 508 and/or 506 from the first mode to the second mode.

Embodiments of methods and products (network node and wireless device) according to the disclosure are set out in the following items:

Item 1. A method, performed at a wireless device, for capability signalling, wherein the wireless device comprises one or more antenna panels configured to communicate with a network node, the method comprising:
obtaining (S102) a capability of at least one of the antenna panels, wherein the capability comprises at least one of: a receive-only panel, ROP, capability, a transmit-only panel, TOP, capability, a receive-and-transmit panel, RTP, capability and a dynamic RTP capability; and
transmitting (S104), to the network node, control signalling indicative of the obtained capability of the at least one antenna panel.

Item 2. The method according to item 1, the method comprising:
receiving (S106), from the network node, control signalling indicative of one or more antenna panels to be activated; and
activating (S108) the one or more panels indicated by the control signalling received.

Item 3. The method according to any of the previous items, the method comprising:
communicating (S110), between the wireless device and the network node, control signalling indicative of switching of one of the antenna panels having a dynamic RTP capability from a first mode to a second mode, wherein the first mode comprises one of: a ROP mode, a TOP mode, and RTP mode, wherein the second mode comprises one of: a ROP mode, a TOP mode, and RTP mode; and
switching (S112) the indicated antenna panel from the first mode to the second mode.

Item 4. The method according to any of items 2-3, the method comprising:
establishing (S114) a beam pair for uplink and downlink in response to the switching (S112) and/or in response to the activating (S108).

Item 5. The method according to any of items 3-4, wherein communicating (S110), between the wireless device and the network node, control signalling indicative of switching of one of the antenna panels comprises receiving (S110A) from the network node, control signalling instructing the wireless device to switch the one antenna panel from the first mode to the second mode.

Item 6. The method according to any of items 3-4, wherein communicating (S110), between the wireless device and the network node, control signalling indicative of switching of one of the antenna panels comprises transmitting (S110B), to the network node, control signalling indicating to the network node that the wireless device intends to switch the one antenna panel from the first mode to the second mode.

Item 7. The method according to any of items 3-6, wherein the control signalling indicative of switching indicates a time period and wherein the method comprises performing an additional switching of the one antenna panel in response to expiry of the time period.

Item 8. A method, performed at a network node, wherein the network node is configured to communicate with a wireless device via one or more antenna panels of the wireless device, the method comprising:
receiving (S202), from the wireless device, control signalling indicative of a capability, the capability comprising at least one of: a receive-only panel, ROP, capability, a transmit-only panel, TOP, capability, a receive-and-transmit panel, RTP, capability and a dynamic RTP capability; and
scheduling (S204) transmission of the wireless device based on the capability indicated by the received control signalling.

Item 9. The method according to item 8, the method comprising:
selecting (S206), based on the capability indicated, one or more antenna panels to activate,
transmitting (S207), to the wireless device, control signalling indicative of the selected one or more antenna panels.

Item 10. The method according to any of items 8-9, the method comprising:
communicating (S208), between the wireless device and the network node, control signalling indicative of switching of one of the antenna panels having a dynamic RTP capability from a first mode to a second mode,
wherein the first mode comprises one of: a ROP mode, a TOP mode, and RTP mode, wherein the second mode comprises one of: a ROP mode, a TOP mode, and RTP mode.

Item 11. The method according to item 10, wherein communicating (S208), between the wireless device and the network node, control signalling indicative of switching of one of the antenna panels comprises transmitting (S208A) to the wireless device, control signalling instructing the wireless device to switch the indicated antenna panel having a dynamic RTP capability from the first mode to the second mode.

Item 12. The method according to item 10, wherein communicating (S208), between the wireless device and the network node, control signalling indicative of switching of one of the antenna panels comprises receiving (S208B), from the wireless device, control signalling indicating to the network node that the wireless device intends to switch the one antenna panel from the first mode to the second mode.

Item 13. The method according to any of items 8-12, the method comprising:
selecting (S210), based on the capability indicated and received quality metrics per antenna panels, one or more antenna panels for communication.

Item 14. The method according to any of items 8-13, wherein scheduling (S204) transmission of the wireless device based on the capability indicated by the received control signalling comprises scheduling (S204A) an uplink transmission for an antenna panel having at least one of: the TOP capability, the RTP capability and the dynamic RTP capability.

Item 15. The method according to any of items 8-14, wherein scheduling (S204) transmission of the wireless device based on the capability indicated by the received control signalling comprises scheduling (S204B) a downlink transmission for an antenna panel having at least one of: the ROP capability, the RTP capability and the dynamic RTP capability.

Item 16. A wireless device comprising a memory module, a processor module, and a wireless interface, wherein the wireless device is configured to perform any of the methods according to any of items 1-7.

Item 17. A network node comprising a memory module, a processor module, and a wireless interface, wherein the network node is configured to perform any of the methods according to any of items 8-15.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1A-6 comprises some circuitries or operations which are illustrated with a solid line and some circuitries or operations which are illustrated with a dashed line. The circuitries or operations which are comprised in a solid line are circuitries or operations which are comprised in the broadest example embodiment. The circuitries or operations which are comprised in a dashed line are example embodiments which may be comprised in, or a part of, or are further circuitries or operations which may be taken in addition to the circuitries or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A method, performed at a wireless device, for capability signaling, wherein the wireless device comprises one or more antenna panels configured to communicate with a network node, the method comprising:
   obtaining a capability of at least one of the antenna panels, wherein the capability comprises at least one of:
      a receive-only panel (ROP) capability;
      a transmit-only panel (TOP) capability;
      a receive-and-transmit panel (RTP) capability indicative of a capability of the at least one antenna panel to receive and transmit; and/or
      a dynamic RTP capability indicative of a capability of the at least one antenna panel to switch between one or more of:
         a ROP mode;
         a TOP mode; and/or
         a RTP mode;
   transmitting, to the network node, first control signaling indicative of the obtained capability of the at least one antenna panel;
   receiving second control signaling from the network node, the second control signaling comprising a panel identifier corresponding to a selected antenna panel having the RTP capability or the dynamic RTP capability, the second control signaling being indicative of:
      switching between the receive capability and the transmit capability for the selected antenna panel having the RTP capability; or
      switching between the one or more of the ROP mode, the TOP mode, and/or the RTP mode for the selected antenna panel having the dynamic RTP capability; and
   switching the selected antenna panel corresponding to the panel identifier between:
      the receive capability and the transmit capability for the selected antenna panel having the RTP capability; or
      the one or more of the ROP mode, the TOP mode, and/or the RTP mode for the selected antenna panel having the dynamic RTP capability.

2. The method according to claim 1, further comprising:
   receiving, from the network node, the second control signaling indicative of one or more antenna panels to be activated; and
   activating the one or more panels indicated by the second control signaling received.

3. The method according to claim 1, further comprising:
   communicating, between the wireless device and the network node, the second control signaling indicative of switching of one of the antenna panels having a dynamic RTP capability from a first mode to a second mode, wherein the first mode comprises one of: a ROP mode, a TOP mode, a RTP mode and a deactivate mode, wherein the second mode comprises one of: a ROP mode, a TOP mode, a RTP mode and a deactivate mode; and
   switching the indicated antenna panel from the first mode to the second mode.

4. The method according to claim 3, further comprising:
   establishing a beam pair for uplink and downlink in response to the switching and/or in response to the activating.

5. The method according to claim 3, wherein the communicating, between the wireless device and the network node, the second control signaling indicative of switching of one of the antenna panels comprises receiving from the network node, the second control signaling instructing the wireless device to switch the one antenna panel from the first mode to the second mode.

6. The method according to claim 3, wherein the communicating, between the wireless device and the network node, the second control signaling indicative of switching of one of the antenna panels comprises transmitting, to the network node, further control signaling indicating to the network node that the wireless device intends to switch the one antenna panel from the first mode to the second mode.

7. The method according to claim 3, wherein the second control signaling indicative of switching indicates a time period and wherein the method comprises performing an additional switching of the one antenna panel in response to expiry of the time period.

8. A wireless device comprising
a memory module;
a processor module; and
a wireless interface,
wherein the wireless device is configured to perform the method of claim 1.

9. The method of claim 1, wherein the transmitting the control signaling comprises transmitting control signaling indicative of a panel identifier.

10. A method, performed at a network node, wherein the network node is configured to communicate with a wireless device via one or more antenna panels of the wireless device, the method comprising:
receiving, from the wireless device, first control signaling indicative of a capability of at least one antenna panel of the one or more antenna panels of the wireless device, the capability comprising at least one of:
a receive-only panel (ROP) capability;
a transmit-only panel (TOP) capability;
a receive-and-transmit panel (RTP) capability indicative of capability of the at least one antenna panel to receive and transmit; or
a dynamic RTP capability indicative of a capability of the at least one antenna panel to switch between one or more of:
a ROP mode;
a TOP mode; and/or
a RTP mode; and
transmitting second control signaling to the wireless device, the second control signaling comprising a panel identifier corresponding to a selected antenna panel of the wireless device having the RTP capability or the dynamic RTP capability, the second control signaling being indicative of:
switching between the receive capability and the transmit capability for the selected antenna panel of the wireless device having the RTP capability; or
switching between the one or more of the ROP mode, the TOP mode, and/or the RTP mode for the selected antenna panel of the wireless device having the dynamic RTP capability,
wherein the second control signaling causes the wireless device to switch the selected antenna panel corresponding to the panel identifier between:
the receive capability and the transmit capability for the selected antenna panel having the RTP capability; or
the one or more of the ROP mode, the TOP mode, and/or the RTP mode for the selected antenna panel having the dynamic RTP capability; and
scheduling transmission of the wireless device based on the capability indicated by the received first control signaling.

11. The method according to claim 10, further comprising:
selecting, based on the capability indicated, one or more antenna panels to activate; and
transmitting, to the wireless device, the second control signaling indicative of the selected one or more antenna panels.

12. The method according to claim 10, further comprising:
communicating, between the wireless device and the network node, the second control signaling indicative of switching of one of the antenna panels having a dynamic RTP capability from a first mode to a second mode,
wherein the first mode comprises one of: a ROP mode, a TOP mode, a RTP mode and a deactivate mode, wherein the second mode comprises one of: a ROP mode, a TOP mode, a RTP mode and a deactivate mode.

13. The method according to claim 12, wherein the communicating, between the wireless device and the network node, the second control signaling indicative of switching of one of the antenna panels comprises transmitting to the wireless device, the second control signaling instructing the wireless device to switch the indicated antenna panel having a dynamic RTP capability from the first mode to the second mode.

14. The method according to claim 12, wherein the communicating, between the wireless device and the network node, the second control signaling indicative of switching of one of the antenna panels comprises receiving, from the wireless device, the first control signaling indicating to the network node that the wireless device intends to switch the one antenna panel from the first mode to the second mode.

15. The method according to claim 10, further comprising:
selecting, based on the capability indicated and received quality metrics per antenna panels, one or more antenna panels for communication.

16. The method according to claim 10, wherein the scheduling the transmission of the wireless device based on the capability indicated by the received first control signaling comprises scheduling an uplink transmission for an antenna panel having at least one of: the TOP capability, the RTP capability and the dynamic RTP capability.

17. The method according to claim 10, wherein the scheduling the transmission of the wireless device based on the capability indicated by the received first control signaling comprises scheduling a downlink transmission for an antenna panel having at least one of: the ROP capability, the RTP capability and the dynamic RTP capability.

18. A network node comprising
a memory module;
a processor module; and
a wireless interface,
wherein the network node is configured to perform the method of claim 10.

19. The method of claim 10, wherein the transmitting the control signaling comprises transmitting control signaling indicative of a panel identifier.

* * * * *